United States Patent [19]

Schutten et al.

[11] Patent Number: 4,716,335
[45] Date of Patent: Dec. 29, 1987

[54] LUMINESCENT SCREEN AND LOW-PRESSURE MERCURY VAPOR DISCHARGE LAMP PROVIDED WITH SUCH A SCREEN

[75] Inventors: Evert D. Schutten, Roosendaal; Johannus G. Verlijsdonk, Eindhoven, both of Netherlands

[73] Assignee: U.S. Philips Corporation, New York, N.Y.

[21] Appl. No.: 869,750

[22] Filed: Jun. 2, 1986

[30] Foreign Application Priority Data

Jun. 4, 1985 [NL] Netherlands ............................. 8501599

[51] Int. Cl.$^4$ ............................................. C09K 11/475
[52] U.S. Cl. ............................ 313/486; 252/301.4 F; 428/690
[58] Field of Search ................. 252/301.4 F; 313/486; 428/690

[56] References Cited

U.S. PATENT DOCUMENTS

| | | | |
|---|---|---|---|
| 3,523,091 | 8/1970 | McAllister | 252/301.4 F |
| 3,758,413 | 9/1973 | Peters | 252/301.4 F |

FOREIGN PATENT DOCUMENTS 1039951  9/1983  U.S.S.R. ..................... 252/301.4 F

*Primary Examiner*—Jack Cooper
*Attorney, Agent, or Firm*—John C. Fox

[57] ABSTRACT

A luminescent screen provided with a terbium-activated silicate having a cuspidine crystal structure according to the formula $Y_{4-x-z-p}Ca_xM_z^{II}Tb_pSi_{2-y}Al_yO_{7+x+z+y}N_{2-x-z-y}$. In this formula $M^{II}$ is at least one of the elements Mg, Sr and Ba. The yttrium can be replaced up to at most 50 mol. % by Gd and/or La. It further holds that:

$0 \leq x \leq 1.9$
$0 \leq z \leq 1.0$
$o \leq y \leq 1.9$
$x+z+y \leq 1.9$
$0.05 \leq p \leq 1.5$.

4 Claims, 2 Drawing Figures

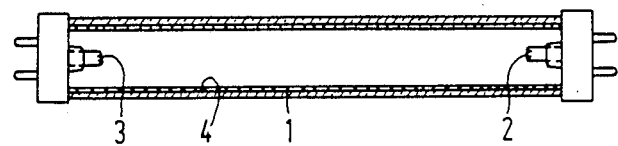
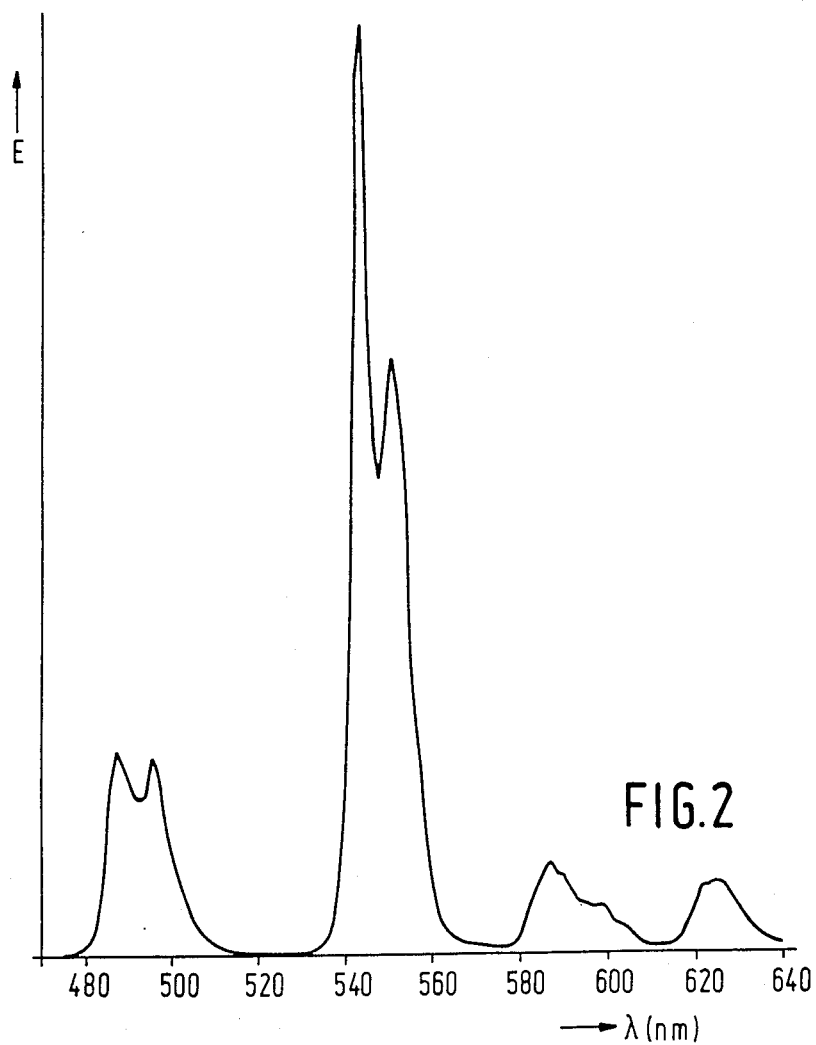

LUMINESCENT SCREEN AND LOW-PRESSURE MERCURY VAPOR DISCHARGE LAMP PROVIDED WITH SUCH A SCREEN

BACKGROUND OF THE INVENTION

The invention relates to a luminescent screen provided with a luminescent layer which is applied to a carrier and comprises a luminescent terbium-activated silicate having a cuspidine crystal structure. The invention further relates to a low-pressure mercury vapour discharge lamp provided with such a luminescent screen.

From the article in Philips Res. Repts. 1967, 22, 481–504, luminescent terbium-activated silicates are known, whose fundamental lattice corresponds to the formula $Y_2Ca_2Si_2O_9$. This silicate and also the isomorphous compound $Y_4Al_2O_9$, of which the terbium activation is also described, have the monoclinic crystal structure of the mineral cuspidine ($Ca_4Si_2O_7F_2$). Terbium-activated silicates having a fundamental lattice of the type $Y_2SiO_5$ and $Y_2Si_2O_7$ are further known, for example, from U.S. Pat. Nos. 3,523,091 and 3,758,413.

The element terbium is a frequently used activator for luminescent materials because in many crystal lattices it gives rise to a very luminescence, the characteristic green $Tb^{3+}$ emission being emitted. Upon excitation by ultraviolet radiation, however, it is a condition for obtaining an efficient luminescence that the luminescent material is excited by radiation having a wavelength lying in the maximum or very close to the maximum of the excitation spectrum of the material. An important application of such materials is found in low-pressure mercury vapour discharge lamps. In such lamps, mainly ultraviolet radiation having a wavelegth of about 54 nm is produced. A great disadvantage of many Tb-activated materials is that the maximum of the excitation band of the terbium is found at wave-lengths comparatively far from 254 nm. In those cases, an efficient luminescence can be obtained only if the excitation energy is first absorbed in a second activator, whereupon this energy is transferred to the terbium. During this absorption and transfer, of course losses may occur.

The invention has for its object to provide luminescent screens comprising new luminescent materials which are activated by terbium and which in practical applications can be directly excited in the terbium.

SUMMARY OF THE INVENTION

According to the invention, a luminescent screen of the kind mentioned in the opening paragraph is characterized in that the silicate corresponds to the formula $Y_{4-x-z-p}Ca_xM_z^{II}Tb_pSi_{2-y}Al_yO_{7+x+z+y}N_{2-x-z-y}$, where $M^{II}$ represents at least one of the elements Mg, Sr and Ba, where the yttrium can be replaced up to at most 50 mol.% by at least one of the elements Gd and La and in which $0 \leq x \leq 1.9$
$0 \leq z \leq 1.0$
$0 \leq y \leq 1.9$
$x+z+y \leq 1.9$
$0.05 \leq p \leq 1.5$.

It has been found that nitrogen-containing silicates on the basis of the lattice $Y_4Si_2O_7N_2$ form very efficiently luminescing materials upon activation by terbium. The $Y_4Si_2O_7N_2$ has the cuspidine crystal structure and is a material known per se (see, for example, C. R. Hebd. Seances Acad. Sci. Ser. C. 1976, 273 (15) 675–7).

It has been found that the corresponding compounds $Gd_4Si_2O_7N_2$ and $La_4Si_2O_7N_2$ having a cuspidine structure can also be obtained. However, upon activation by Tb, these compounds have too low a quantum efficiency for practical applications. Therefore, in the luminescent silicates according to the invention, yttrium is used, which can be replaced by at most 50 mol.% Gd and/or La. Such a replacement does not influence the crystal structure of the silicate and substantially does not influence the luminescent properties.

In the $Y_4Si_2O_7N_2$ lattice, the yttrium can further be replaced in part by Ca and the elements Mg, Sr and Ba represented by $M^{II}$, while further the Si can be replaced in part by Al. In the substitutions with Ca and Al, the cuspidine structure is maintained. Substitutions with the $M^{II}$ elements are possible only to a limited extent because with too large quantities of $M^{II}$ undesirable secondary phases are formed. Therefore, in the silicates at most 25 mol.% of the yttrium is replaced by $M^{II}$ ($z \leq 1.0$). In the substitutions with Ca, $M^{II}$ and/or with Al, in order to obtain charge compensation, the same molar quantity of N has to be replaced by O. It has been found that a continuous sequence of compounds with a decreasing nitrogen content is possible between the compound $Y_4Si_2O_7N_2$ and the compounds only containing oxygen $Y_2Ca_2Si_2O_9$ and $Y_4Al_2O_9$. It has been found that the nitrogen-containing silicates and the silicates only containing oxygen have a different excitation spectrum upon activation by terbium. A great advantage is that by a suitable choice of the O:N ratio the location of the maximum of the excitation spectrum can be adapted within certain limits to a value desired for a given application.

It appears from the general formula and conditions stated above for the luminescent silicates of luminescent screens according to the invention that at most 1.9 mol of the Y is replaced by Ca ($x \leq 1.9$) and also at most 1.9 mol of the Si is replaced by Al ($y \leq 1.9$). If at the same time substitutions take place of both Y by Ca (and, as the case may be, $M^{II}$) and of Si by Al, these substitutions altogether also mount to at most 1.9 ($x+z+y \leq 1.9$). In fact it is necessary that the luminescent silicate contains a minimum quantity of nitrogen (0.1 mol of N per mole of silicate). The terbium content p is at least 0.05 because at smaller values of p too low luminous fluxes are obtained due to too low an absorption of exciting radiation. The terbium content is at most 1.5 because at larger values too small luminous fluxes are obtained due to concentration quenching.

Use is preferably made of a luminescent screen according to the invention, which is characterized in that the silicate corresponds to the formula $Y_{4-x-p}Ca_xTb_pSi_2O_{7+x}N_{2-x}$, where $0.5 \leq x \leq 1.5$. In fact it has been found that the highest luminous fluxes are obtained with the calcium-containing silicates which do not contain $M^{II}$ and do not contain Al either, especially upon excitation by 254 nm radiation. The substitution of Ca within the given limits results in that higher quantum efficiencies are obtained and in that a satisfactory adaptation of the excitation spectrum to the radiation produced in a low-pressure mercury vapour discharge lamp is obtained. A very advantageous application of the luminescent screens is therefore found in low-pressure mercury vapour discharge lamps.

The luminescent silicates can be obtained by a solid state reaction at a high temperature of a mixture of starting materials formed from oxides of the constituent elements or from compounds producing these oxides upon an increase in temperature. The nitrogen is mostly added to the mixture as $Si_3N_4$, in general an excess of nitrogen, for example of 10 mol.%, being used. A small excess of silicon, for example a few mol.%, may also be used to favour the procedure of the solid state reaction. The mixture is heated once or several times at a temperature of 1200°–1700° C. in a weakly reducing atmosphere, the luminescent silicate then being formed.

Examples of luminescent silicates suitable for a luminescent screen according to the invention will now be described more fully with reference to a drawing, an example of preparation and a number of measurements.

BRIEF DESCRIPTION OF THE DRAWING

In the drawing:

FIG. 1 shows a low-pressure mercury vapour discharge lamp according to the invention, and FIG. 2 shows the spectral energy distribution of the emission of a terbium-activated silicate.

DESCRIPTION OF THE PREFERRED EMBODIMENTS

FIG. 1 shows diagrammatically and in sectional view a low-pressure mercury vapour discharge lamp provided with a tubular glass wall 1. At the ends of the lamp there are arranged electrodes 2 and 3, between which the discharge is maintained during operation. The lamp is provided with a small quantity of mercury and with a rare gas as a starting gas. The wall 1 constitutes the carrier for a luminescent screen and is provided at the inner surface with a luminescent layer 4, which comprises a luminescent silicate according to the invention. The layer 4 can be applied to the wall 1 in a usual manner, for example by means of a suspension containing the luminescent silicate.

EXAMPLE 1

A mixture was made of 7.598 g of $Y_2O_3$
0.662 g of $Tb_4O_7$
0.426 g of $SiO_2$
1.368 g of $Si_3N_4$.

This mixture was heated in a molybdenum crucible for 1 hour at 1350° C. in a closed furnace, through which a flow (6 l/min) of nitrogen containing 5% by volume of hydrogen was passed. After cooling and pulverization, the product obtained was heated once more for 2 hours at 1500° C. in the same atmosphere. After cooling and homogenization, a terbium-activated silicate was obtained according to the formula $Y_{3.8}Tb_{0.2}Si_2O_7N_2$. It was demonstrated by means of X-ray diffraction analysis that this silicate (like all the following examples of luminescent silicates according to the invention) had the cuspidine crystal structure. Upon excitation by short-wave ultraviolet radiation (mainly 254 nm), the silicate exhibited the characteristic green line emission of $Tb^{3+}$. The silicate had a quantum efficiency of 55%, while the absorption of the exciting 254 nm radiation amounted to 88%.

EXAMPLES 2 TO 7

In the same manner as described in Example 1, a number of terbium-activated silicates of different compositions were prepared. The formulae of these silicates and the results of the measurement of the quantum efficiency (QE in %) upon excitation by 254 nm radiation and the absorption (A in %) of the exciting radiation are indicated in the following table.

| Example | Formula | A | QE |
|---|---|---|---|
| 1 | $Y_{3.8}Tb_{0.2}Si_2O_7N_2$ (1) | 88 | 55 |
| 2 | $Y_{3.6}Tb_{0.4}Si_2O_7N_2$ (2) | 91 | 64 |
| 3 | $Y_{3.6}Tb_{0.4}SiAlO_8N$ | 92 | 48 |
| 4 | $Y_{3.3}Ca_{0.5}Tb_{0.2}Si_2O_{7.5}N_{1.5}$ (1) | 85 | 62 |
| 5 | $Y_{2.8}CaTb_{0.2}Si_2O_8N$ (1) | 80 | 72 |
| 6 | $Y_{2.55}Ca_{1.25}Tb_{0.2}Si_2O_{8.25}N_{0.75}$ | 79 | 77 |
| 7 | $Y_{2.3}Ca_{1.5}Tb_{0.2}Si_2O_{8.5}N_{0.5}$ | 80 | 74 |

(1) The maximum of the excitation spectrum of the silicates according to the Examples 1, 4 and 5 and of the silicate only containing oxygen (not in accordance with the invention): $Y_{1.8}Ca_2Tb_{0.2}Si_2O_9$, is found at 263, 259, 255 and 235 nm, respectively.

(2) The spectral energy distribution of the emission of this silicate (at 254 nm excitation) is shown in FIG. 2. In this Figure, the wavelength λ in nm is plotted on the abscissa and the relative radiation intensity E in arbitrary units is plotted on the ordinate.

What is claimed is:

1. A luminescent screen provided with a luminescent layer which is applied to a carrier and which comprises a luminescent terbium-activated silicate having a cuspidine crystal structure, characterized in that the silicate corresponds to the formula $Y_{4-x-z-p}Ca_xM_z^{II}Tb_pSi_{2-y}Al_yO_{7+x+z+y}N_{2-x-z-y}$, where $M^{II}$ represents at least one of the elements Mg, Sr and Ba, where the yttrium is replaceable up to at most 50 mol.% by at least one of the elements Gd and La and $0 \leq x \leq 1.9$
$0 \leq z \leq 1.0$
$0 \leq y \leq 1.9$
$x+z+y \leq 1.9$
$0.05 \leq p \leq 1.5$.

2. A low-pressure mercury vapour discharge lamp provided with a luminescent screen as claimed in claim 1.

3. A luminescent screen as claimed in claim 1, characterized in that the silicate corresponds to the formula $Y_{4-x-p}Ca_xTb_pSi_2O_{7+x}N_{2-x}$, where $0.5 \leq x \leq 1.5$.

4. A low-pressure mercury vapour discharge lamp provided with a luminescent screen as claimed in claim 3.

* * * * *